United States Patent [19]
Chang

[11] Patent Number: 6,137,679
[45] Date of Patent: Oct. 24, 2000

[54] MULTI-BUS MOBILE HARD DISK DRIVE RACK

[76] Inventor: Cheng-Chun Chang, 2F-2, No. 9, Lane 236, Sec. 5, Lo-Szu-Fu Rd., Taipei, Taiwan

[21] Appl. No.: 09/090,428

[22] Filed: Jun. 4, 1998

[51] Int. Cl.$^7$ .............................. H05K 5/00; A47B 81/00; A47B 97/00
[52] U.S. Cl. ....................... 361/685; 361/686; 312/223.1; 312/223.2; 174/52.1
[58] Field of Search .................................. 361/685, 686; 174/52.1; 312/223.1, 223.2

[56] References Cited

U.S. PATENT DOCUMENTS

| | | | |
|---|---|---|---|
| 4,941,841 | 7/1990 | Darden et al. | 439/377 |
| 5,041,924 | 8/1991 | Blackborow et al. | 360/69 |
| 5,507,650 | 4/1996 | Larabell | 439/61 |
| 5,694,290 | 12/1997 | Chang | 361/685 |
| 5,761,033 | 6/1998 | Wilhelm | 361/686 |
| 5,767,445 | 6/1998 | Wu | 174/52.1 |

*Primary Examiner*—Leo P. Picard
*Assistant Examiner*—Tung Minh Bui
*Attorney, Agent, or Firm*—Dougherty & Troxell

[57] ABSTRACT

A mobile hard disk drive (HDD) rack includes an inner casing adapted to receive an HDD therein and having a plurality of connectors of different interface specifications to be selectively connected to the HDD. The inner casing includes a first conversion circuit which converts the interface specification of each of the connectors into a predetermined interface specification. An outer casing is adapted to be mounted in a computer to receive the inner casing therein and electrically connect thereto. The outer casing may optionally include a second conversion circuit which converts the predetermined interface specification into a plurality of different interface specifications each having a connector mounted on the outer casing associated therewith so as to allow the computers of different HDD interfaces to be selectively connected thereto. By means of such an arrangement, HDDs of different interfaces may be readily and exchangeably connected to the computers of different HDD interfaces.

4 Claims, 5 Drawing Sheets

MULTI-BUS MOBILE HARD DISK DRIVE RACK

FIELD OF THE INVENTION

The present invention relates generally to a mobile hard disk drive (HDD) rack and in particular to a mobile HDD rack having connecting means compatible with different hard disk interfaces so as to allow a single HDD rack to be compatible with HDDs having different interface specifications.

BACKGROUND OF THE INVENTION

Mobile HDD racks are provided to allow computer users to readily change HDD between different computers or to change computer with different HDDs. The HDDs that are currently available in the market have a number of different interface specifications, including IDE (40 pins), SCSI (50 pins) and WIDE SCSI (68 pins) which are in general not compatible with each other. In other words, a computer having a main board taking for example the SCSI interface has to use HDDs of the SCSI interface and under such a situation, the mobile HDD rack to be used with the computer and the HDD has to be of SCSI interface. Thus, it may be very cumbersome for the computer users in attempting to connect the HDDs to computers of different interface specifications.

Thus, it is desirable to provide a mobile HDD rack which allows HDDs of different interface specifications to be readily connected to computers of different interface specifications so as to overcome the above problem.

SUMMARY OF THE INVENTION

Therefore, an object of the present invention is to provide a mobile HDD rack comprising an outer casing mounted in a computer and an inner casing received in and electrically connected to the outer casing, the outer casing being capable to connect to the computer main board having different specifications of HDD interface and the inner casing being capable to connect HDDs of different interfaces so as to allow HDDs of different interfaces to be connectable to the computers.

Another object of the present invention is to provide a mobile HDD rack comprising an outer casing mounted in and electrically connected to a computer and an inner casing received in and in electrical connection with the outer casing, the inner casing receiving an HDD therein and converting the interface specification of the HDD into a predetermined interface which is acceptable to the computer via the outer casing. The HDD may be of the 68 pin WIDE SCSI interface, while the computer has an HDD interface of 50 pin SCSI specification.

To achieve the above objects, in accordance with the present invention, there is provided a mobile HDD rack comprising an inner casing adapted to receive an HDD therein and having a plurality of connectors of different interface specifications to be selectively connected to the HDD. The inner casing comprises a first conversion circuit which converts the interface specification of each of the connectors into a predetermined interface specification. An outer casing is adapted to be mounted in a computer to receive the inner casing therein and electrically connect thereto. The outer casing may optionally comprise a second conversion circuit which converts the predetermined interface specification into a plurality of different interface specifications each having a connector mounted on the outer casing associated therewith so as to allow the computers of different HDD interfaces to be selectively connected thereto.

BRIEF DESCRIPTION OF THE DRAWINGS

The present invention will be better understood from the following description of a preferred embodiment thereof, with reference to the attached drawings, wherein.

DETAILED DESCRIPTION OF THE PREFERRED EMBODIMENT

Figure 1:
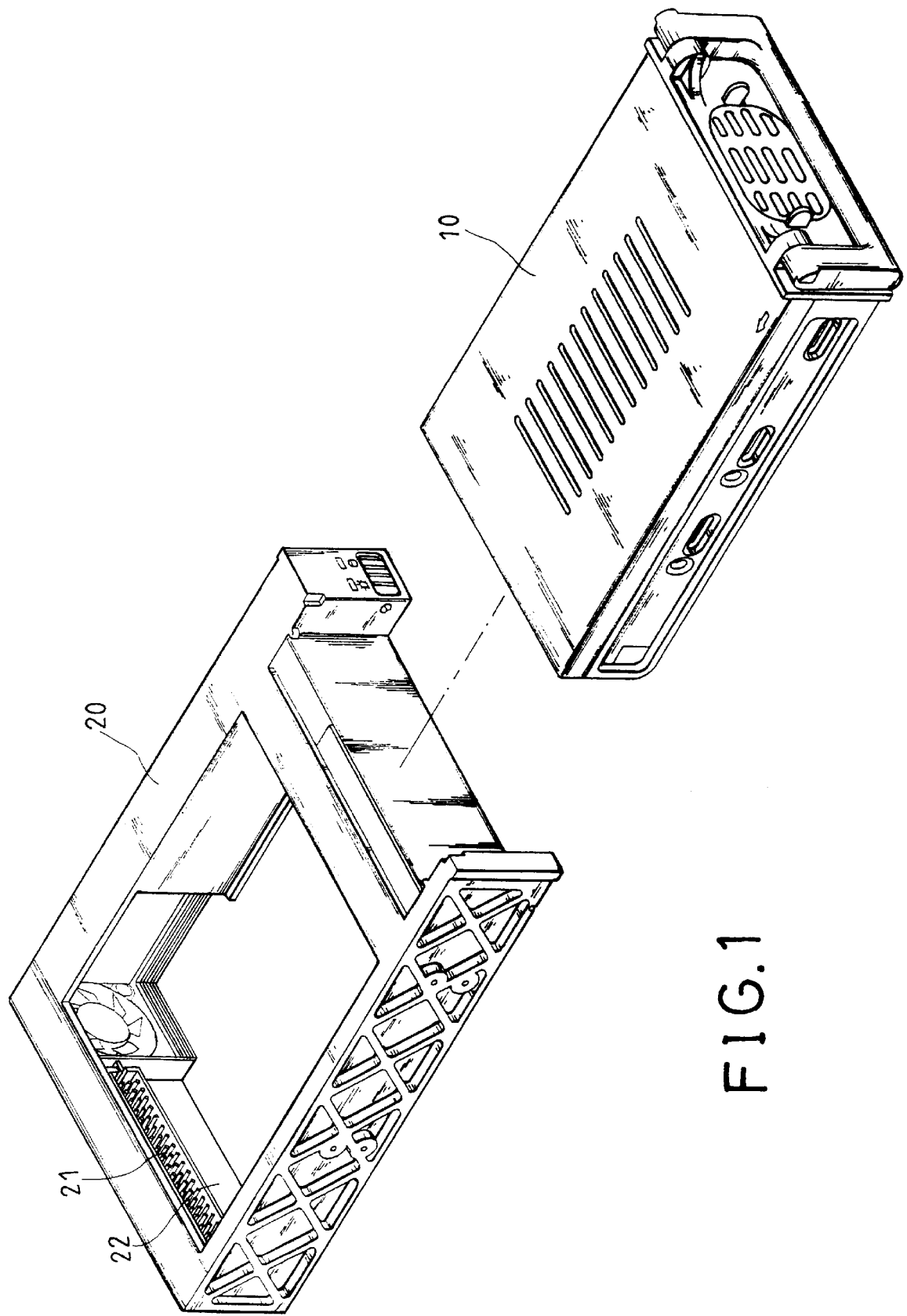
FIG. 1 is an exploded perspective view showing a mobile HDD rack constructed in accordance with the present invention.

With reference to the drawings and in particular to FIG. 1, wherein a mobile hard disk drive (HDD) rack constructed in accordance with the present invention is shown, the HDD rack of the present invention comprises an inner casing 10 and an outer casing 20. The inner casing 10 receives an HDD (not shown) and is received in the outer casing 20. Connector means is provided in both the inner casing 10 and the outer casing 20 to connect the HDD to the inner casing 10 and the outer casing 20 for establishing electrical connection and data communication therebetween.

Figure 2:
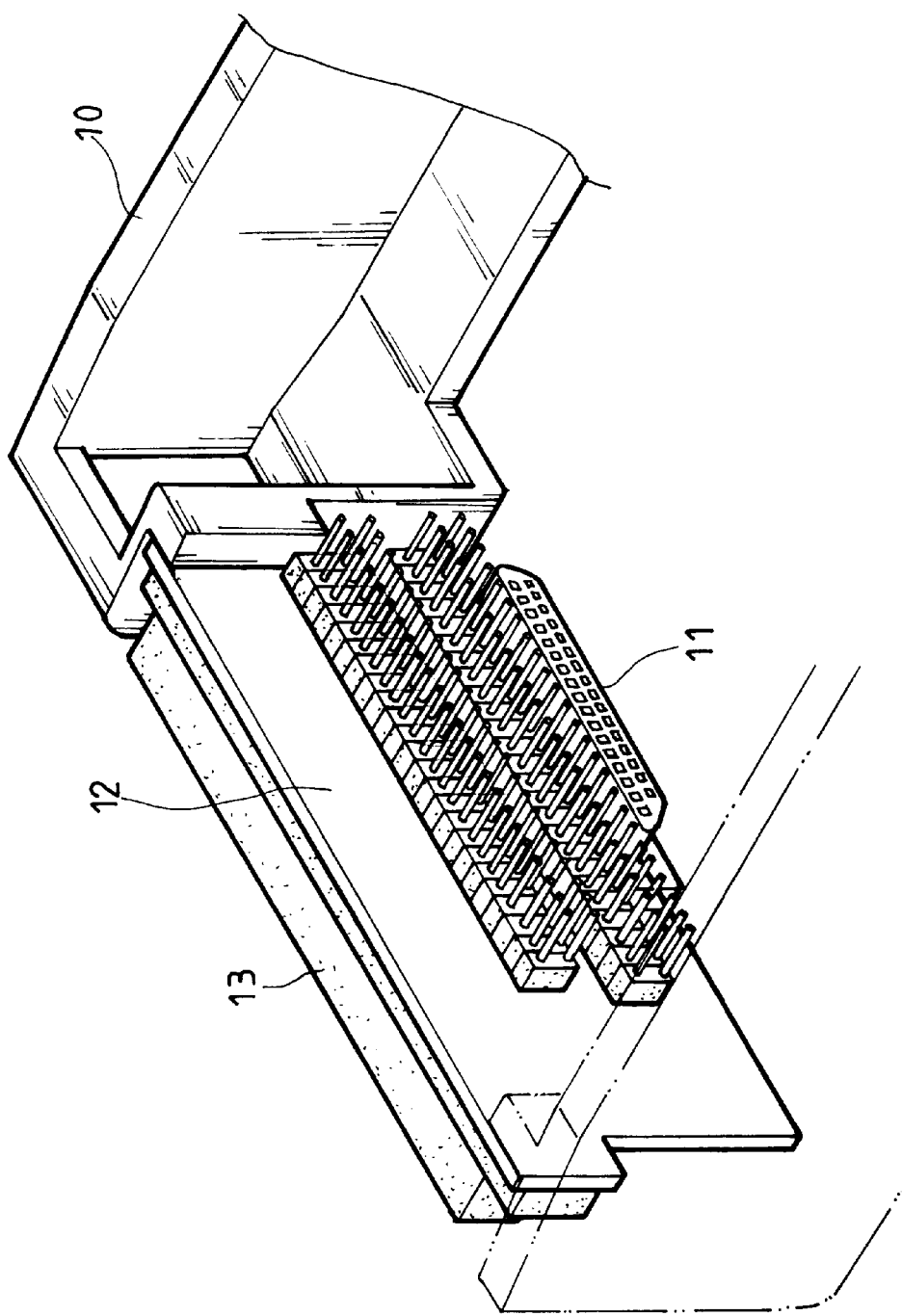
FIG. 2 is a perspective view of a portion of the inner casing of the mobile HDD rack of the present invention, showing the connection means of the inner casing.

As shown in FIG. 2, the inner casing 10 of the HDD rack of the present invention comprises connection means having a plurality of connectors 11 formed on the inner casing 10, each associated with one of a number of different interface specifications available for HDDs that are available in the market, including but not limited to IDE, SCSI and WIDE SCSI which are the most commonly available interfaces for HDDs. A first conversion circuit 12 which may be constructed in the form of a printed circuit board is also provided on the inner casing 10 for interfacing between the three connectors 11 of different interface specifications and a common external connector 13 which is also mounted on the inner casing 10. The conversion circuit 12 is able to convert the interface specification of each of the connector 11 into a predetermined specification which is taken by the connector 13.

Figure 3:
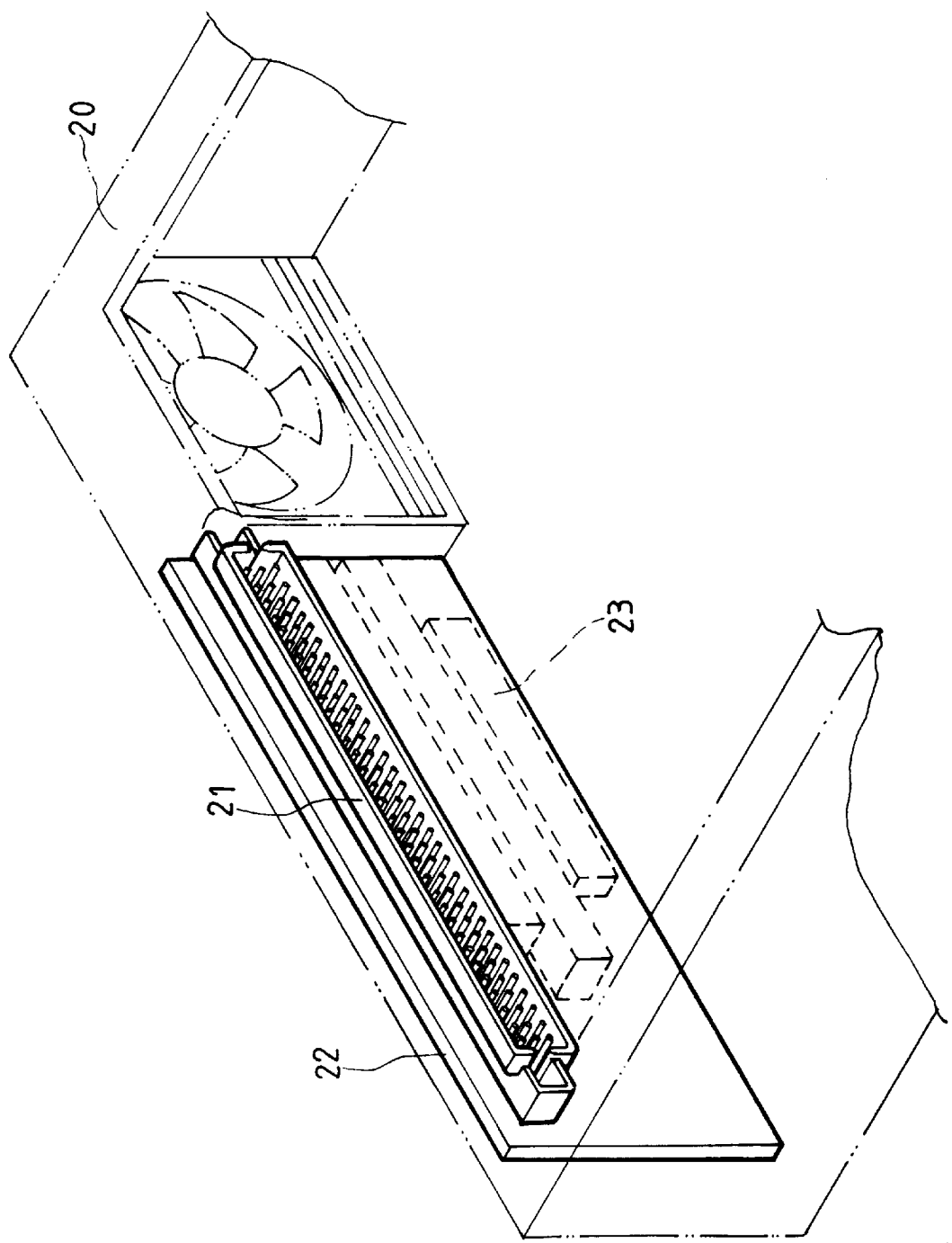
FIG. 3 is a perspective view of a portion of the outer casing of the mobile HDD rack of the present invention, showing the connection means of the outer casing.

As shown in FIG. 3, the outer casing 20 is provided with connection means comprising an internal connector 21 which is mated, in both spatial position and mechanical and electrical construction, with the external connector 13 of the inner casing 10 so as to establish electrical connection and communication between the outer casing 20 and the inner casing 10. The connection means of the outer casing 20 also comprises a second conversion circuit 22 which performs a counter conversion with respect to the conversion performed by the conversion circuit 12 of the inner casing 10. Connectors 23 having different HDD interface specifications which may be corresponding to the HDD connectors 11 of the inner casing 10 are provided on the outer casing 20 and in electrical connection with the second conversion circuit 22 so that the outer casing 20 is connectable to a computer hard disk controller or computer main board (not shown) using any interface specifications associated with the connectors 23.

Alternatively, the second conversion circuit 22 may be omitted and the predetermined interface specification is the one used by the computer main so that the outer casing 20 may directly connected to the computer main board. For example, the HDD to be connected to the computer may be of the WIDE SCSI interface, which is converted by the first conversion circuit 12 into the SCSI interface that is used by the computer main board so that no conversion is made between the outer casing 20 and the computer main board.

Figure 4:
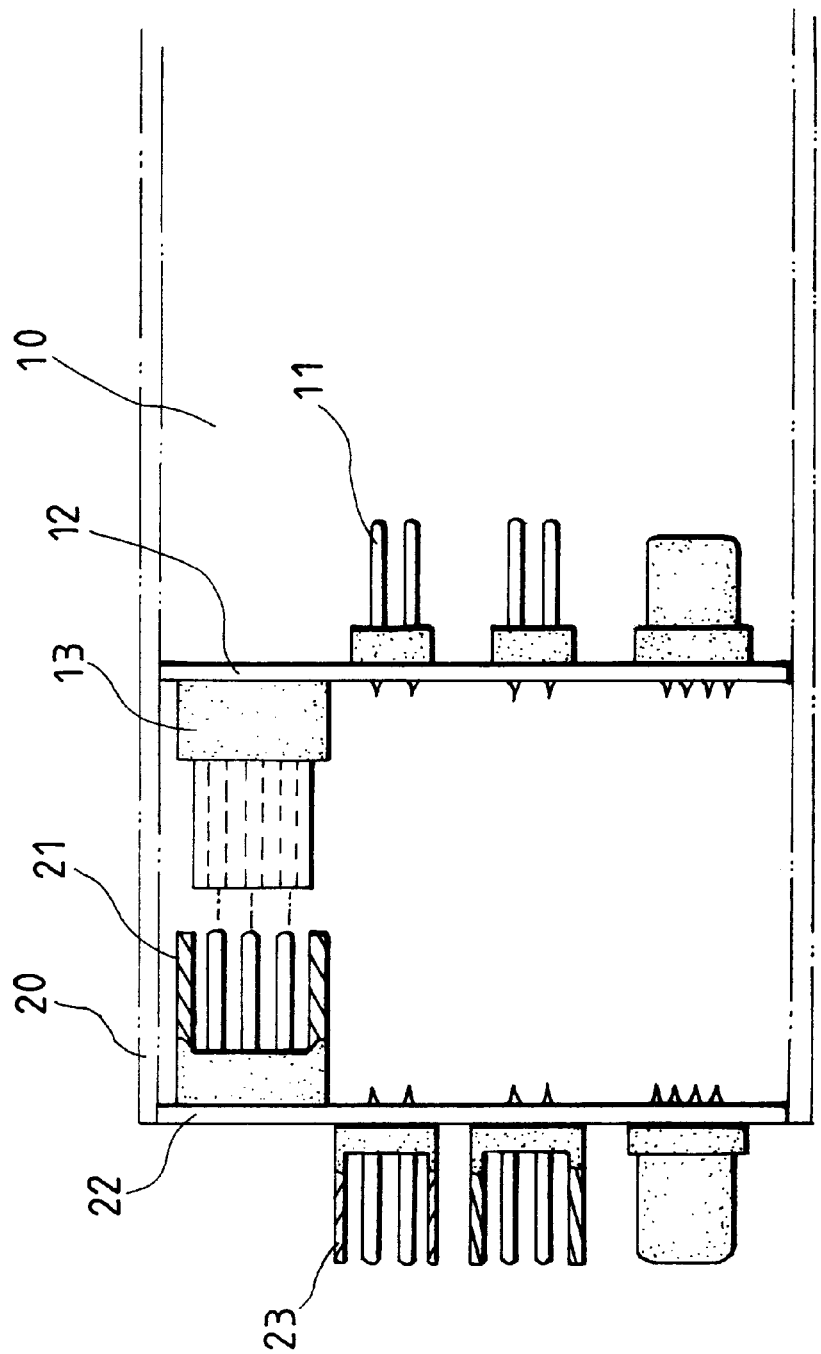
FIGS. 4 and 5 are schematic side views showing the connection of the inner casing to the outer casing.
Figure 5:
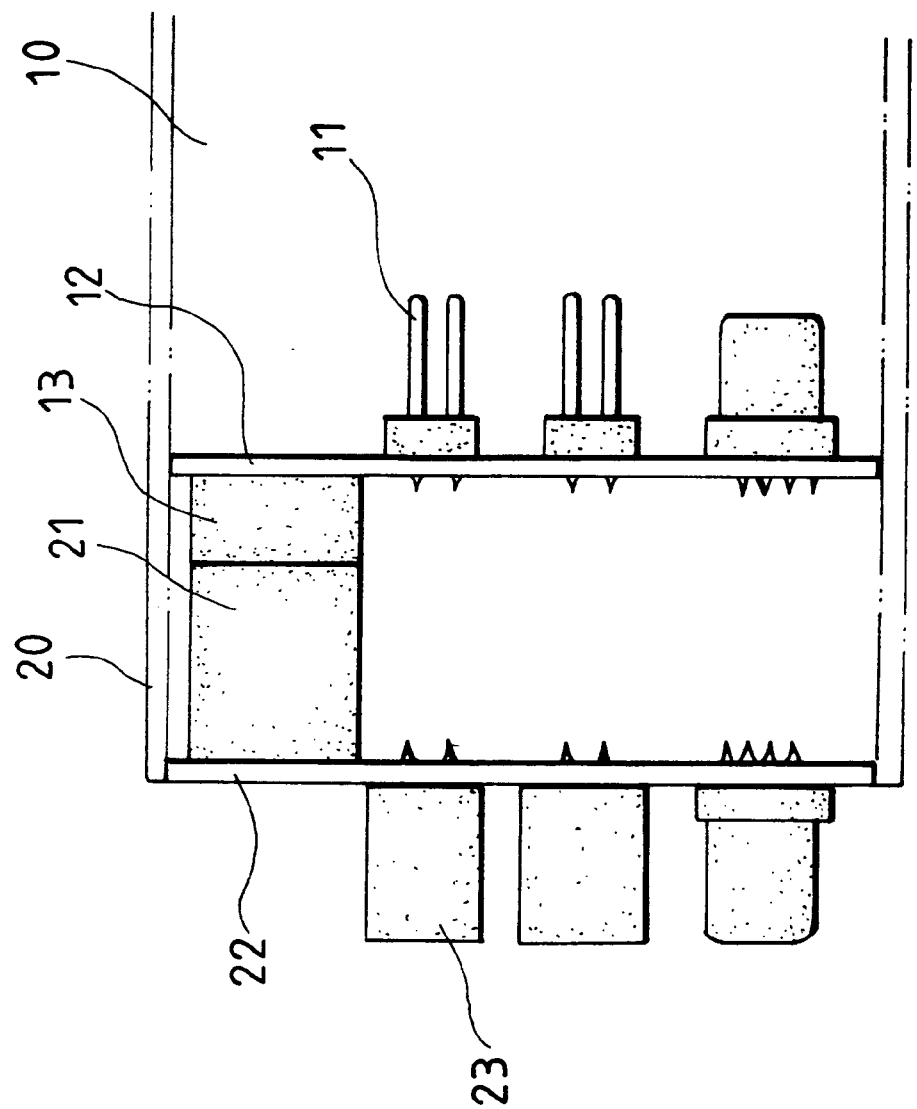

By means of the provision of the pair of mated connectors 13 and 21 on the inner casing 10 and the outer casing 20, an HDD of any of the interface specifications associated with the HDD connectors 11 may be accommodated in the inner casing 10 and connected to the associated one of the HDD connectors 11 and then the inner casing 10 is inserted into the outer casing 20 and connected together by means of the connectors 13 and 21, as shown in FIGS. 4 and 5. The outer casing 20 is mounted in a computer casing (not shown) in advance and connected to the computer main board by means of any one of the connectors 23 in accordance with the interface specification taken by the computer main board. Thus, with the interconnection between the inner casing 10 and the outer casing 20, HDDs of different interfaces are connectable to the computer which may use the same or different HDD interface as/from that of the HDD mounted in the inner casing 10. For example, the HDD received in the inner casing 10 may has a 68-pin WIDE SCSI interface which is converted by the conversion circuit 12 first and then counter-converted by the second conversion circuit 22 into for example 50-pin SCSI interface specification adapted by the computer to which the HDD is to be connected.

Of course, an HDD of the same specification as that the computer may take may also be connected to the computer by means of the HDD rack of the present invention via the circuits 12 and 22.

Although the preferred embodiment has been described to illustrate the present invention, it is apparent that changes and modifications in the embodiment can be carried out without departing from the scope of the invention which is intended to be limited only by the appended claims.

What is claimed is:

1. A connecting system for connecting a mobile hard disk drive having a connector with a first interface specification with a computer having a connector with a second interface specification different from the first interface specification, the connecting system comprising:

a) an outer casing having: an interior; a plurality of first connectors on the outer casing, each first connector having an interface specification different from the other first connectors, only one of the first connectors having an interface specification the same as the second interface specification so as to be connected to the computer; a single second connector; and a first conversion circuit connecting all of the plurality of first connectors to the single second connector;

b) an inner casing having: a single third connector configured and located so as to matingly connect with the single first connector when the inner casing is located in the interior of the outer casing; a plurality of fourth connectors, each fourth connector having an interface specification different from the other fourth connectors, only one of the fourth connectors having an interface specification the same as the first interface specification of the hard disk drive so as to be connected to the hard disk drive; and, a second circuit connecting all of the plurality of fourth connectors to the single third connector, whereby placing the inner casing in the interior of the outer casing connects the single second and third connectors thereby connecting the hard disk drive to the computer.

2. The connecting system of claim 1 wherein the first circuit comprises a first printed circuit board.

3. The connecting system of claim 1 wherein the second circuit comprises a printed circuit board.

4. The connecting system of claim 2 wherein the second circuit comprises a second printed circuit board.

* * * * *